United States Patent [19]

Heckelman et al.

[11] 4,188,621
[45] Feb. 12, 1980

[54] ALARM SYSTEM

[75] Inventors: James D. Heckelman, Norwalk; Robert A. Ziemke, Sandusky, both of Ohio

[73] Assignee: Dan-Mar Co. Inc., Huron, Ohio

[21] Appl. No.: 870,337

[22] Filed: Jan. 18, 1978

[51] Int. Cl.² .................. B60R 25/00; G08B 13/22
[52] U.S. Cl. ........................... 340/528; 340/63; 307/247 R; 340/309.1; 340/541; 328/75; 328/130; 328/48
[58] Field of Search .................. 307/293, 247 R; 328/129, 130, 48, 75, 5, 7; 340/63, 309.1, 527, 528, 541

[56] References Cited

U.S. PATENT DOCUMENTS

| | | |
|---|---|---|
| 3,050,708 | 8/1962 | Van Alstyne et al. .......... 328/129 X |
| 3,422,398 | 1/1969 | Rubin ................................. 340/63 |
| 3,585,584 | 6/1971 | Behrend ............................. 340/528 |
| 3,636,549 | 1/1972 | Berman et al. ................... 340/309.1 |
| 3,824,480 | 7/1974 | Eshraghian ........................ 328/130 |
| 3,876,950 | 4/1975 | O'Connor .......................... 328/130 |
| 3,936,745 | 2/1976 | Harrington ...................... 328/129 X |

Primary Examiner—John S. Heyman
Attorney, Agent, or Firm—W. Preston Hickey

[57] ABSTRACT

A control circuit utilizing: a counter which provides first and second output signals at spaced apart time intervals and delay means for stopping and starting the counter; and switch means having start and stop inputs and an output connected to the delay means of the counter. The switch means, being arranged to start the counter when the start input is energized, and being arranged to stop the counter when the stop input is energized. The stop input of the switch means being actuated by the first counter output signal.

16 Claims, 2 Drawing Figures

ALARM SYSTEM

The present invention relates to timing circuits for performing control functions at spaced apart time intervals in the order of magnitude of a minute or more.

BACKGROUND OF THE INVENTION

Electrical circuits comprising resistances and capacitances are used to provide time delay functions. When these circuits, called RC circuits, are used to provide time delays of more than a couple seconds, they require very large capacitors which are expensive and progressively less reliable as their size increases.

An object of the present invention is the provision of a new and improved rugged, inexpensive, and reliable control circuitry for providing timing functions.

Further objects and advantages of the invention will become apparent to those skilled in the art to which it relates from the following description of the preferred embodiments described with reference to the accompanying drawings.

DESCRIPTION OF THE PREFERRED EMBODIMENTS

Figure 1:
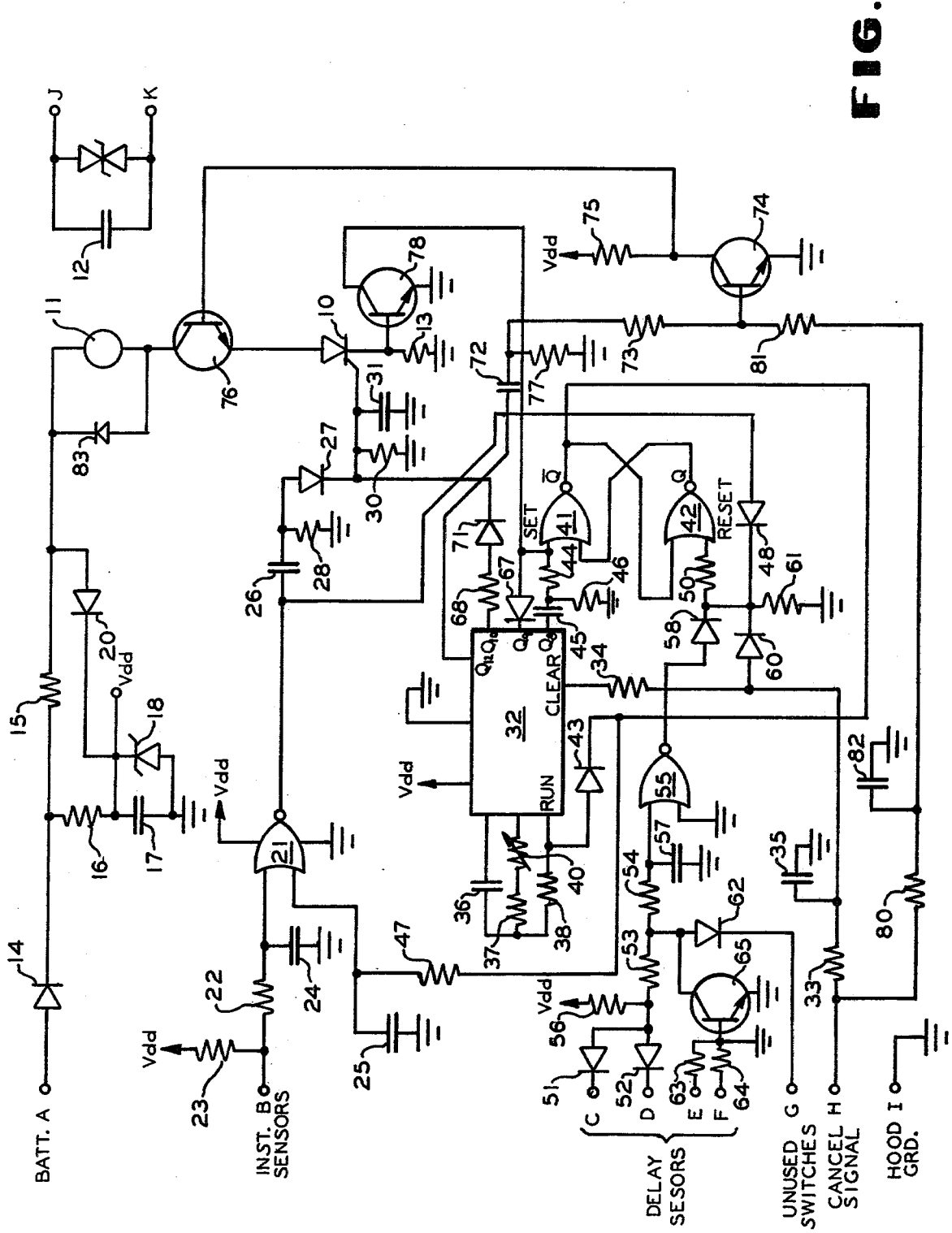
FIG. 1 is a schematic wiring diagram of an alarm system embodying principles of the present invention.

The embodiment of controlled circuitry shown in FIG. 1 is designed specifically to be used with a digital code unlocking system for an automotive vehicle, as for the example that described in our application entitled: Digital Anti-Theft Locking Circuit. The system shown in FIG. 1 is started when the cancel signal at H is removed. The cancel signal is removed when the automobile ignition switch is turned off. When the cancel signal is removed, the binary counter used in the circuitry of this application starts to run for approximately 30 seconds and will then shut itself off providing the operator has shut the car door. Thereafter, the binary counter will be started again when the car door is opened. If the car doors are open and the proper code is not fed into the system within approximately 10 seconds, an alarm is sounded which lasts for approximately 120 seconds. The alarm can, of course, be stopped at any time, if the proper code is entered, but if the code is not entered, the alarm shuts off for approximately 40 seconds and then sounds again for a period lasting approximately 240 seconds. Thereafter, it will continue to be off for 40 seconds and on for 240 seconds until the system is stopped or the car battery wears down. Obviously, a resistance and capacitance circuit for such time periods is impractical. Obviously, also, stepper switches and their contacts are subject to a number of mechanical type failures, and are very expensive.

In the embodiment shown in FIG. 1, the alarm is turned on and off by an SCR (silicon controlled rectifier) 10 that is in the power supply line of a relay coil 11 whose normally open contacts 12 operate the alarm when closed. The cathode of the SCR is connected to ground through resistor 13, for reasons which will later be given, and power is supplied to the relay coil P11 from the 12 volt battery of the vehicle on which it is installed through a diode 14 and resistor 15. Power for the Vdd bus is obtained from the 12 volt battery through diode 14 and resistor 16. Zener diode 18 prevents Vdd from exceeding 13 volts. Capacitor 17, which is connected in parallel with Zener diode 18, filters out high frequency transients which might otherwise appear on the Vdd bus. Diode 20 clamps the voltage supplied to the relay coil 11 at 13.6 volts, thereby protecting transistor 76 from high voltage transients which are normally present on the lead from the 12 volt battery. Another diode 83 suppresses transients that occur when the current flow through relay coil 11 is abruptly stopped.

It will be desired in many instances to operate the alarm immediately when some portions of the car, as for example the trunk, hood, or a tilt switch adjacent some particular part that is to be protected are opened or tampered with. In most instances, it is desired that these switches be normally open grounding switches, so that means must be provided for providing a positive signal to the gate of the SCR 10 when the switch is grounded. This is accomplished by connecting the switch whose terminal is designated B in the drawing to one input of a NOR gate 21 through a resistor 22. A positive voltage from the input terminal of the Zener diode 18 marked Vdd is connected to the terminal of the switch B and the resistor 22 through a pull-up resistor 23. The opposite side of the resistor 22 is connected to the input of NOR gate 21. Capacitor 24 which is connected between the input of NOR gate 21 and ground filters out high frequency transients. The other input of the NOR gate 21 is connected to ground through a capacitor 25, and the output terminal of the NOR gate 21 is connected to the gate of the SCR 10 through a capacitor 26 and diode 27. The output of the capacitor 26 is connected to ground through resistor 28, so that it will provide a pulse type signal to the SCR 10. The gate of the SCR 10 is connected to ground through bleed resistor 30 and capacitor 31, to respectively remove leakage from the gate of the SCR, and reduce the sensitivity of the SCR to high frequency noise and DVDT transients.

The new and improved time delay and counting circuitry of the present invention comprises a binary counter and oscillator 32 which has a number of square wave outputs, the frequency of which is successively halved; and accompanying circuitry utilizes various combinations of the outputs to provide the desired periods of delay and actuation of the alarm system. Instead of operating the binary counter 32 in the usual way wherein it would be reset to time T-O at each actuation, the accompanying circuitry starts and stops the binary counter without setting it back to the starting point of its cycle. Only at the time that the operator properly enters the digital code into the computer system of the automotive protective device does it supply a cancel signal to the input terminal H which energizes the clear input terminal of the binary counter through resistors 33 and 34 to clear the binary counter and set it back to time T-O. Capacitor 35 connects the junction of resistors 33 and 34 to filter out high frequency transients.

The particular binary couner shown in the drawings is an RCA 14 Stage Ripple Carry Binary Counter and Oscillator Model CD 4060 AE in which only the Q8, Q9, Q10, and Q12 outputs are utilized. The binary counter also has oscillator terminals between which resistances and capacitances of different values can be connected externally to change the frequency of its oscillator; and in the present instance, this is done by the capacitor 36, resistors 37, and 38 and variable resistor 40. It so happens that whenever the binary counter "RUN" terminal is grounded through diode 43 the oscillator will stop without resetting the binary counter.

The circuitry for utilizing combinations of the outputs of the binary counter to effect time delays and actuation periods comprises a flipflop formed by NOR gates 41 and 42 with the Q output of the NOR gate 41 being connected to a junction of resistor 38 and the oscillator "RUN" terminal through diode 43. Diode 43 is arranged to clamp the "RUN" terminal to ground when it is desired to stop the oscillator. The output of NOR gate 42 is connected to the bottom input of NOR gate 41 and the top input of NOR gate 41 is connected to the Q8 output of the binary counter through resistor 44 and capacitor 45. The resistor 44 may not be necessary in all instances, but it performs a current limiting function in the present instance. The junction of the capacitor 45 and resistor 44 is connected to ground through a bleed resistor 46, so that the capacitor will only provide a short pulse to the NOR gate input even though the Q8 output remains high approximately for 10 seconds. This allows the flipflop to operate as will now be explained. The Q output of NOR gate 41 is connected to the top input of NOR gate 42, and the bottom input of the NOR gate 42 is used as the set input for the flip-flop and will start the counting of the oscillator within the binary counter chip 32. The top terminal of NOR gate 41 is used as the reset input for the flip-flop and will stop the oscillator. The reset input is controlled by a combination of the outputs Q8 and Q9 of the binary counter.

In the "cleared" condition of the binary counter, no output is provided to the top "set" terminal of NOR gate 41 while the output of NOR gate 42 is at ground potential, so that the Q output is high. The Q output of NOR gate 41 stays high until such time as a signal appears on its "set" terminal. This positive Q signal is transmitted through resistor 47 to the bottom input of NOR gate 21 to disable the instantaneous sensors in the cleared condition of the binary counter, so that the instantaneous sensors are not enabled until 30 seconds after the cancel signal is removed. Capacitor 25, together with resistor 47 form an RC delay network. This network delays the application of an inhibit signal to the bottom input of NOR gate 21 sufficiently long to permit SCR 10 to be triggered when a signal is received from an instantaneous sensor connected to B.

When an instantaneous sensor is activated, it is desired to have the alarm sound for approximately 120seconds, turn off for approximately 40 seconds, and then sound again for a longer period. This is accomplished by connecting the output of NOR gate 21 to the reset input of NOR gate 42 through diode 48 and resistor 50.

Some cars utilize grounding switches that are actuated by the doors and in the embodiment shown in FIG. 1, two such switches C and D are indicated. These switches are connected through diodes 51 and 52 respectively and through series resistors 53 and 54 to the top input of NOR gate 55. A positive Vdd voltage is fed to the junction of diode 52 and resistor 53 through resistor 56 and this voltage is normally used to charge a capacitor 57 connected between the top input of NOR gate 55 and ground. The bottom input of NOR gate 55 is connected to ground so that before the doors are opened, the positive signal on the top input of NOR gate 55 causes a ground signal to be communicated through diode 58 through resistor 50 to the bottom or reset input of NOR gate 42. When one of the switches connected to C or D is closed to ground out the positive voltage in the top input of NOR gate 55, the output of NOR gate 55 goes high to provide a positive signal on the reset input of the NOR gate 42. This causes its output to go low, and the Q output of NOR gate 41 to go high. It also supplies a positive voltage to diode 43 now to prevent it from grounding out the oscillator RUN terminal, so that the binary counter starts counting to the point where it will sound an alarm if the operator does not enter the vehicle and enter a cancel signal through the terminal H. The cancel signal from terminal H is also communicated through a diode 60 to the reset input of NOR gate 42 which resets the flip-flop so that the oscillator and binary counter 32 will begin counting again when the cancel signal is removed. A bleed resistor 61 connects the cathode of diodes 48, 58, and 60 to ground. In the embodiment shown, a terminal G is provided for any unused keyboard switches, so that when they are actuated they start a delayed alarm signal by communicating ground through diode 62 to the junction of resistors 53 and 54 leading to the top input of NOR gate 55. Because some automobiles utilize door switches, etc. which when actuated, provide a positive voltage, two terminals E and F are shown for converting this positive voltage to a ground signal to actuate the NOR gate 55. Terminals E and F are connected through resistors 63 and 64 respectively to the base of a transistor switch 65, the emitter of which is connected to ground and the collector of which is connected to the anode of diode 62. Transistor 65 will be turned on whenever a positive voltage is applied to either terminals E or F.

Figure 2:
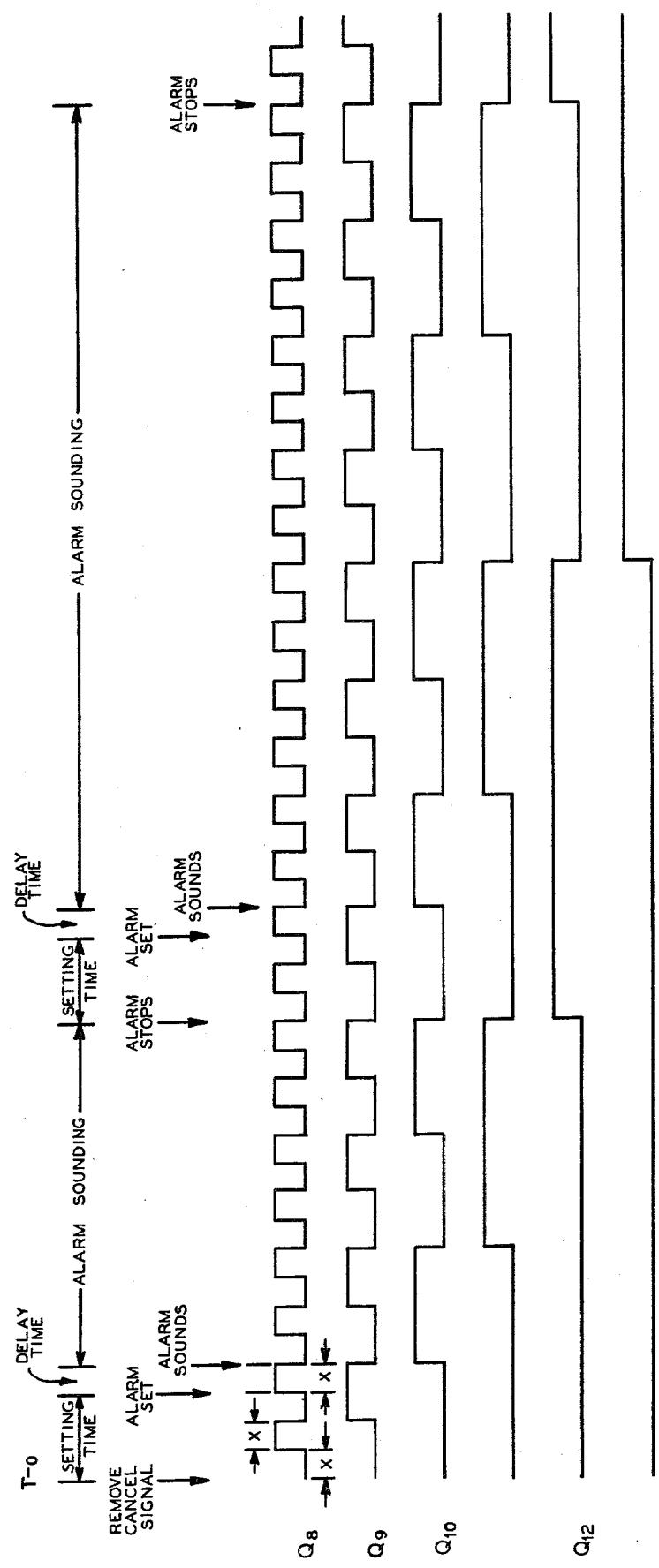
FIG. 2 is a diagram of the voltages at various locations of the circuitry shown in FIG. 1.

An understanding of the time delay and actuating periods of the circuitry just described can best be understood by referring now to FIG. 2 of the drawings. During normal operation, the car is operated with a cancel signal provided to the terminal H. Square wave signals are provided on the outputs Q8, Q9, Q10 and Q12 as shown extending across the figure, and the time constance of the oscillator is such that, the X or half way time cycle for the Q8 output is 10 seconds. When the operator locks up the vehicle, he cancels the clear signal on terminal H and has 30 seconds to shut the door to assure that the binary counter will stop at the end of the "setting time". The figure starts at time T-O which is when the cancel signal on the terminal H is removed so that a delay period of 30 seconds occurs until the Q8 and Q9 outputs provide a positive pulse to the set terminal of NOR gate 41 to stop the oscillator. The circuitry stays in this condition until a door is opened or one of the other delay sensors is actuated following which a further 10 second "delay time" occurs before the alarm is sounded. The "delay time" allows the operator to open a door and enter a clear signal. The X period can, of course, be adjusted as previously indicated by changing resistors 37, 38, 40 and capacitor 36 which in the present instance, however, are sized to give the 10 second interval.

Referring now to FIG. 1 again it will be seen that the set input of NOR gate 41 is connected to the Q9 output through diode 67 with its cathode connected to the Q9 output. With this arrangement, the Q9 output will ground out positive pulses from the Q8 output until such time as the Q9 output is high. Both Q8 and Q9 outputs are high after three one-half cycles of the Q8 output and is indicated by the "alarm set" line in FIG. 2. At this time, a high is produced on the set input of NOR gate 41 causing the Q output to go low, thus enabling NOR gate 21 and grounding out the "RUN" terminal of the oscillator, so that it stops counting. The circuitry remains indefinitely in this condition until such time as one of the sensors are actuated, such as a door is opened.

If a door, etc. connected to terminals C through F is actuated, a signal is provided at the reset input for NOR gate 42 causing its output to go low. The Q output of the Nor gate 41 now goes high to provide a positive potential to the diode 43 thereby eliminating the grounding condition on the "RUN" terminal, so that the oscillator of the counter 32 now starts running again. After another 10 seconds, the Q10 output of the counter 32 goes high and this signal is transmitted through resistor 68 and diode 71 to the gate of the SCR 10—thus turning the SCR 10 on to sound the alarm. Once the SCR 10 is caused to be conducting, its gate can go to 0 potential without causing it to go into a non-conducting condition. The Q10 output can, therefore, turn on and off without effecting the duration of the alarm signal. The alarm signal is stopped when the Q12 output of the counter goes high, and this signal is transmitted through a capacitor 72 and resistor 73 to the base of a transistor switch 74 to turn the transistor on.

The emitter of the transistor 74 is connected to ground and the collector is connected to the Vdd voltage through a resistor 75. The junction of the collector and the resistor 75 is communicated to the base of a larger transistor 76. The emitter of transistor 76 is connected to the anode of SCR 10 and the collector of transistor 76 is connected to relay coil 11 so that it operates as a disconnect switch in the power supply to SCR 10. It will be seen that a normally positive voltage is applied through resistor 75 to the base of the transistor 76 to hold the transistor on, until such time as the transistor 74 is actuated. This provides a ground signal to the base of the transistor switch 76 to interrupt the power supply to SCR 10. The transistor switch 76 would be held off during th complete positive going signal of the output Q12 were it not for capacitor 72. It will be seen that the switch 76 need be only momentarily interrupted and capacitor 72 performs this function, in conjunction with the resistor 77, which connects the opposite side of the capacitor to ground.

During the time interval between when Q10 goes high to turn SCR 10 on, and the time when the output Q12 goes high to turn it off, the switching functions of the outputs Q8 and Q9 are negated by a transistor 78 which grounds out the set input of NOR gate 41. The base of the transistor 78 is connected to the junction of the resistor 13 and the cathode of SCR 10. The emitter of transistor 78 is connected to ground and the collector of transistor 78 is connected to the stop input of the NOR gate 41. When current flows through SCR 10, transistor 78 is biased on to prevent the Q8 or Q9 outputs from energizing the set input of NOR gate 41 and prematurely stopping the oscillator. Once the current flow through SCR 10 stops, the next pulse coming from the Q8 output which occurs simultaneously with a positive signal from the Q9 output will activate the set input of the NOR gate 41 to stop the oscillator. This signal, of course, is only momentary because of the capacitor 45, and if the signal from the delay sensors still exist at the clear input of the NOR gate 42, its output will be low. Both inputs to the NOR gate 41 are then low to produce a high Q output to cause the oscillator to continue counting. Q10 will then go high again to start the alarm signal sounding again even though Q12 has three-fourths of its positive output time remaining. This is because the capacitor 72 differentiates the Q12 output signal. The alarm this time continues not only for the duration of the Q12 high output, but through the Q12 low output to stop the alarm the next time the Q12 output goes high. In this manner, the second alarm signal is caused to be seven-thirds times as long as the first alarm signal.

It is also desirable to stop the alarm signal immediately whenever a cancel signal is applied to the terminal H. This is accomplished by transmitting the cancel signal through resistor 80 and 81 to the base of transistor 74 which in turn actuates the switch 76 and power supply to SCR 10. A capacitor 82 is connected between the junction of resistors 80 and 81 to ground, to filter out high frequency transients from the circuit.

While the invention has been described in considerable detail, we do not wish to be limited to the particular embodiments shown and described; and it is our intention to cover hereby all novel adaptations, modifications and arrangements thereof which come within the practice of those skilled in the art to which the invention relates.

We claim:

1. A control circuit comprising: a pulse generator providing first and second output signals at spaced apart time intervals, said pulse generator having a clearing terminal and a pause terminal, switch means having start and stop inputs and an output connected to said pause terminal of said pulse generator, said switch means starting said pulse generator when said start input is energize and stopping sadi pulse generator after a first predetermined time period when said stop input is energized, said stop input being actuated by said first pulse generator output signal, and a controlled device actuated by said second output signal after a second predetermined time period when said pause terminal is not actuated by said stop input.

2. The control circuit of claim 1 wherein said pulse generator provides a third output signal at a time subsequent to said second output signal, and means actuated by said third output signal for stopping the controlled device.

3. The control circuit of claim 1 wherein said switch means is a flipflop, said start input is its clear terminal and said stop input is its set terminal.

4. The control circuit of claim 2 wherein said controlled device is of a type which remains actuated after a momentary energization from said second output signal and without a continuing second output signal and which is reset by said third output signal.

5. The control circuit of claim 4 wherein said controlled device is a silicon controlled rectifier with said second output signal operating its gate, and said means operated by said third output signal being a disconnect switch in the power circuit of the silicon controlled rectifier.

6. A control circuit comprising: a pulse generator providing first, second and third output pulsing signals at spaced apart time intervals and delay means connected to said generator for stopping and starting the pulse generator; switch means having start and stop inputs and an output connected to said delay means, said switch means also connected for starting said pulse generator when said start input is actuated; circuit means connecting said first and second output signals of said pulse generator to said stop input of said switch means and being constructed and arranged to require pulses from both first and second output signals to actuate said stop input of said switch means to cause said pulse generator to stop at a second of said spaced apart time intervals; and a controlled device actuated by said third output signal at a third of said spaced apart time intervals when said stop input is not actuated; and whereby said pulse generator continues to run once said start input is pulsed until said stop input of said switch means is pulsed and following which said start input must again be pulsed for the pulse generator to continue.

7. The control circuit of claim 6 wherein said pulse generator provides a fourth output signal at a time subsequent to said third output signal, and means actuated by said fourth output signal for stopping the controlled device.

8. The control circuit of claim 6 including a transistor whose base is energized when electricity is flowing through said controlled device, said transistor being constructed and arranged to deactivate said stop input of said switch means.

9. The control circuit of claim 8 wherein said controlled device is a silicon controlled rectifier with its gate being activated by said third output, and wherein said pulse generator provides a fourth output signal at a time subsequent to said third, a disconnect switch in the power circuit of said silicon controlled rectifier, and means opening said disconnect switch when actuated by said fourth output signal.

10. The control circuit of claim 9 wherein said first, second, third, and fourth pulsing output signals are generally square waves and continue while said pulse generator is running at frequencies which differ for the respective output and which frequencies are successively smaller numerically for successive outputs and whereby a second signal to said start input produces an actuation of said controlled device which is at least twice as long as its first actuation.

11. A control circuit comprising: a pulse generated having first and second generally square wave output signals and an input terminal for stopping its pulse generating each square wave output signal being on and off for generally equal times and said second signal having a duration that is a multiple of that of said first signal, a controlled device having a control element which when pulsed causes the controlled device to stay conductive, a power circuit for said controlled device including a switch, an output circuit connecting said second output signal to said switch, and a condenser in said output circuit, whereby the controlled device is actuated for approximately a half wave of said second output the first time it is actuated and approximately a full wave during subsequent activations.

12. The control circuit of claim 11 wherein said controlled device is a silicon controlled rectifier, said first output signal is connected to the gate of said silicon controlled rectifier, and said switch is in the power circuit of the rectifier.

13. An alarm system comprising: a pulse generator having a clear terminal, a pause terminal, and first, second and third output terminals which are pulsed by the generator at successively greater time intervals; two position trip switch means having on and off inputs and an output connected to said pause terminal to cause said pulse generator to run when said switch means is on and stop when said switch means is off; alarm means actuated by said third output; circuit means actuated by said first and second outputs of said pulse generator and connected to said off input of said two position trip switch means to trip the switch and stop said pulse generator when both first and second outputs of said generator are actuated simultaneously; at least one sensor connected to said on input of said two position trip switch means to start said pulse generator when actuated; code means connected to said clear terminal of said pulse generator; and whereby normal operation of said first and second generator outputs holds said generator in standby until the sensor is actuated to cause the generator to continue, and actuation of the code means clears and resets the generator to disable the system.

14. The alarm system of claim 13 wherein said alarm means includes a trip on switch that is actuated by said third output of said generator, said system further including circuit means for keeping said first and second generator outputs from actuating said off input of said two position switch while current flows through said alarm system.

15. The alarm system of claim 14 wherein said generator includes a fourth output and said alarm means includes a trip off switch actuated by said fourth output.

16. The alarm system of claim 13 wherein said pulse generator has a fourth output and said alarm system has a trip off switch actuated by said fourth output.

* * * * *